United States Patent Office 3,472,142
Patented Oct. 14, 1969

3,472,142
CONTROL ARRANGEMENT FOR PHOTOGRAPHIC APPARATUS
Paul Fahlenberg, Baierbrunn, and Franz Singer, Munich, Germany, assignors to Compur-Werk Gesellschaft mit beschrankter Haftung & Co., Munich, Germany, a German firm
Filed June 23, 1967, Ser. No. 648,488
Claims priority, application Germany, July 1, 1966, C 39,503; Jan. 16, 1967, C 41,229
Int. Cl. G03b 9/02
U.S. Cl. 95—64        7 Claims

ABSTRACT OF THE DISCLOSURE

An electronically operated control arrangement which is capable of controlling, from a remote point, a variable factor on a photographic camera. The electronic circuit includes a bridge, one diagonal of which is connected to a source of current, and a setting motor is provided for setting the variable factor, such as the diaphragm aperture. A manually adjustable resistance is connected in the electronic circuit in such a way that a change in the adjustment of the resistance will cause operation of the motor to open or close the diaphragm to a new aperture corresponding to the new position of the adjustable resistance. The range of adjustment of the manually adjustable resistance is preferably great enough to encompass the complete ranges of movement of all diaphragms with which the control arrangement is likely to be used. When the control arrangement is used with a particular diaphragm whose range of aperture sizes is less than the range corresponding to the manually adjustable resistance, provision is made for disconnecting the manually adjustabl resistance from the operating circuit and connecting, in place of it, a constant resistance suited to the maximum diaphragm aperture of the particular diaphragm being used. When the control arrangement is used with an interchangeable lens and diaphragm unit, cooperating parts on the interchangeable unit and the main unit serve to change the value of an electrical resistance in a manner appropriate to the adjustment range of the diaphragm in the particular interchangeable unit which is being used.

CROSS REFERENCE TO RELATED APPLICATION

This invention is in the nature of an improvement upon the construction disclosed in the copending United States patent application of Paul Fahlenberg, Walter Miessen, and Franz Singer, Ser. No. 532,793, filed Mar. 8, 1966, for control arrangement for photographic apparatus. The disclosure of said copending application is hereby incorporated herein by reference. The present disclosure presupposes that the reader is already familiar with what is disclosed in said application Ser. No. 532,793, and features of construction disclosed in said prior application may be referred to only briefly, if at all, in the present application. The advantages of using a remote control arrangement with a studio camera are sufficiently explained in the prior application, and need not be repeated here.

BACKGROUND OF THE INVENTION

The invention relates broadly to photographic apparatus of various kinds, and provides means for conveniently adjusting, possibly but not necessarily from a remote point, a variable factor such as the speed or timing of a shutter, or the diaphragm aperture of an enlarger, or of a photographic printer. The invention finds its greatest usefulness, however, in adjusting the diaphragm aperture of a photographic camera, and more particularly a camera of the studio type, where the photographer stands behind the camera, looking at a ground glass focusing screen, while composing the picture and adjusting the focus and the depth of field, and where remote control for the diaphragm aperture adjustment is particularly advantageous because it enables the photographer to remain at his post behind the camera and eliminates the need to move around to the front of the camera to change the adjustment of the diaphragm aperture.

BRIEF DESCRIPTION OF THE DRAWINGS

In the accompanying drawings, which are incorporated herein by reference and which constitute a material part of the present disclosure.

DESCRIPTION OF THE PREFERRED EMBODIMENTS

Figure 1:
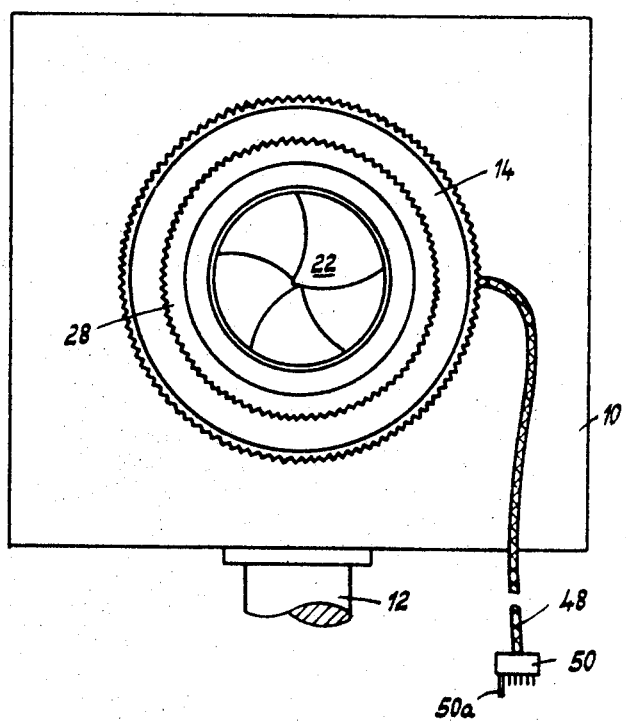
FIG. 1 is a front view of a typical form of photographic camera adapted for use with the electrical control means of the present invention, together with a fragment of its supporting stand.
Figure 2:
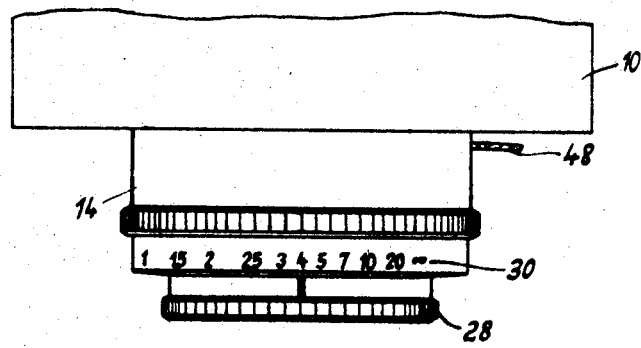
FIG. 2 is a fragmentary top plan view of the camera.
Figure 3:
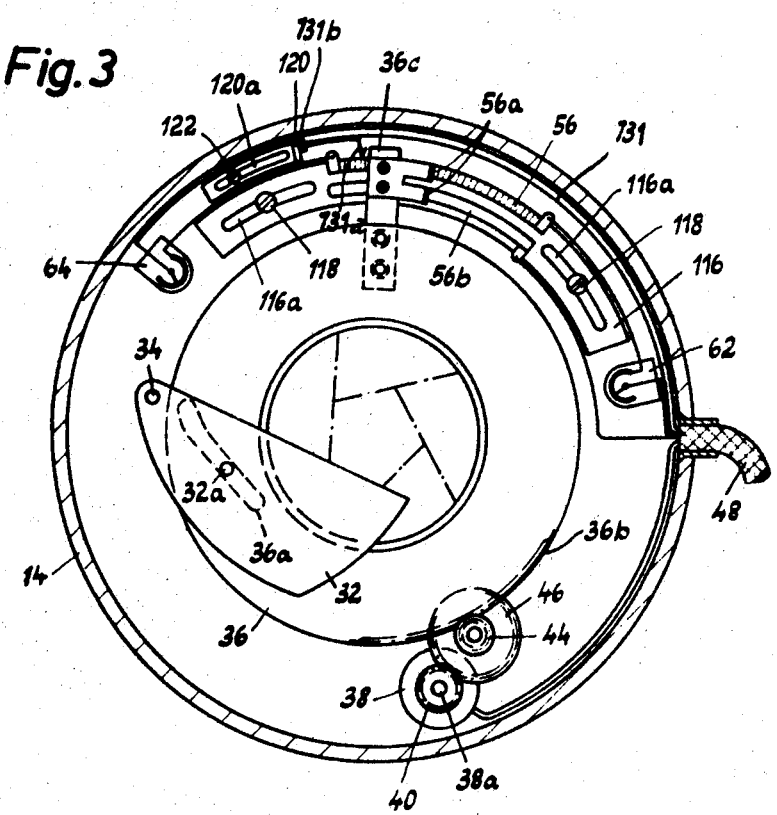
FIG. 3 is a somewhat schematic front view of the diaphragm assembly and associated parts.
Figure 4:
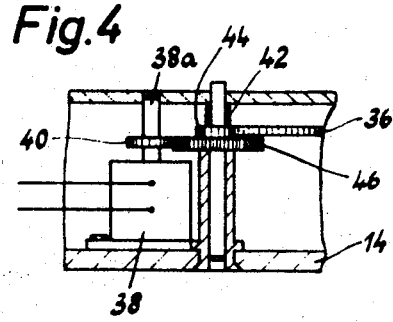
FIG. 4 is a section through the lower part of the construction illustrated in FIG. 3, showing additional details.

Referring first to FIGS. 1 and 2, there is shown a photographic camera having a main body indicated schematically at 10, supported on a suitable support stand 12 of known form. Attached to the front wall of the camera body 10 is the casing or housing 14 of an objective shutter, further details of which are seen in FIGS. 3 and 4. The shutter has the conventional shutter blades 22 (FIG. 1) moved through their opening and closing movements by movement of the usual conventional blade ring (sometimes called a blade driving ring or blade operating ring) which is well known in the art and not here illustrated. The shutter speed, or time during which the blades are open during any particular exposure, and other programmed functions of the shutter, are determined by an electronic control arrangement of known form, not here illustrated, which may be in the form disclosed in United States Patent 3,253,529, granted May 31, 1966 for an invention of Paul Fahlenberg, one of the joint applicants of the present application.

Associated with the shutter 16 is an arrangement, further described below, serving to open and close the shutter blades to provide for inspection of the image before making the actual exposure. Assuming for the moment that the present invention is used with a camera of the studio type (although this is not necessarily the case) the camera will have a ground glass plate or other suitable type of focusing screen mounted at the rear of the camera, and while the shutter blades are open for interim inspection, the image will appear on this focusing screen so that the photographer, standing behind the camera, can properly compose the picture and check the field of view and depth of field and other factors. When the composition has been completed, the shutter blades are closed, and the focusing screen is removed and replaced, for example, by a film holder or film cassette, the construction and use of which are well understood in the art and need not be explained here.

Installed within the shutter housing 14 are known devices for driving the shutter blades through their opening and closing movements, and for regulating the shutter speed or exposure time. The shutter speed may be adjusted manually, either by direct manual pressure or preferably by manually controlled electronic means. In either case, an adjustable setting member is set with reference to an associated scale of exposure periods or shutter speeds. The objective lens, not shown in detail, is also preferably mounted on the shutter housing, in this embodiment of the invention, and is focused by turning the conventional lens focusing ring 28 (FIGS. 1 and 2) and setting it so that an index mark is opposite the desired graduation of the conventional focus distance scale 30.

The shutter also includes, in this embodiment, an iris diaphragm comprising a plurality of diaphragm leaves 32 (FIG. 3) each pivotally mounted on a fixed pin 34 and carrying a control pin 32a which engages in a control slot 36a of a diaphragm control ring 36 rotatably mounted in the housing 14 concentrically with the optical axis. According to the present invention, the diaphragm control ring 36 is not directly adjustable by manual pressure, but is moved by an electrically operated setting motor 38 (FIGS. 3 and 4) the shaft 38a of which has fixed to it a toothed pinion 40 meshing with the teeth of a pinion 46 on another shaft. Another pinion 44 on the other shaft lies against one face of the pinion 46 and is pressed toward the latter by a spring 42 coiled around the shaft, so that the two pinions 44 and 46 constitute a slip clutch. The pinion 44 meshes with gear teeth 36b on part of the periphery of the diaphragm control ring 36.

Figure 5:
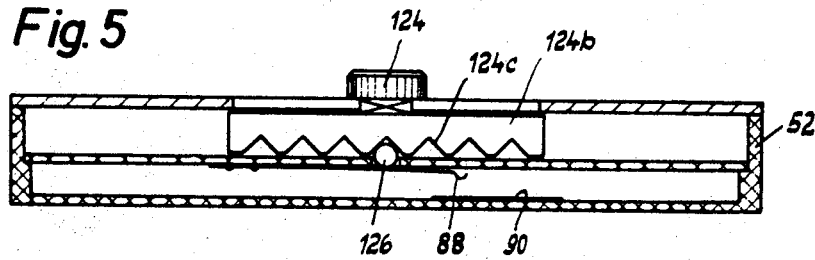
FIG. 5 is a schematic section through a switch box constituting part of the control arrangement of the present invenion.
Figure 7:
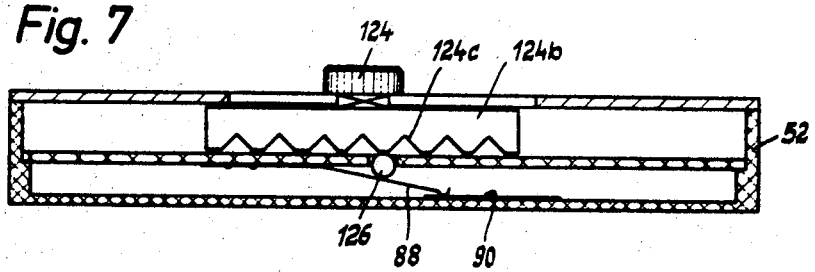
FIG. 7 is a view similar to FIG. 5, showing the illustrated parts in a different position.
Figure 8:
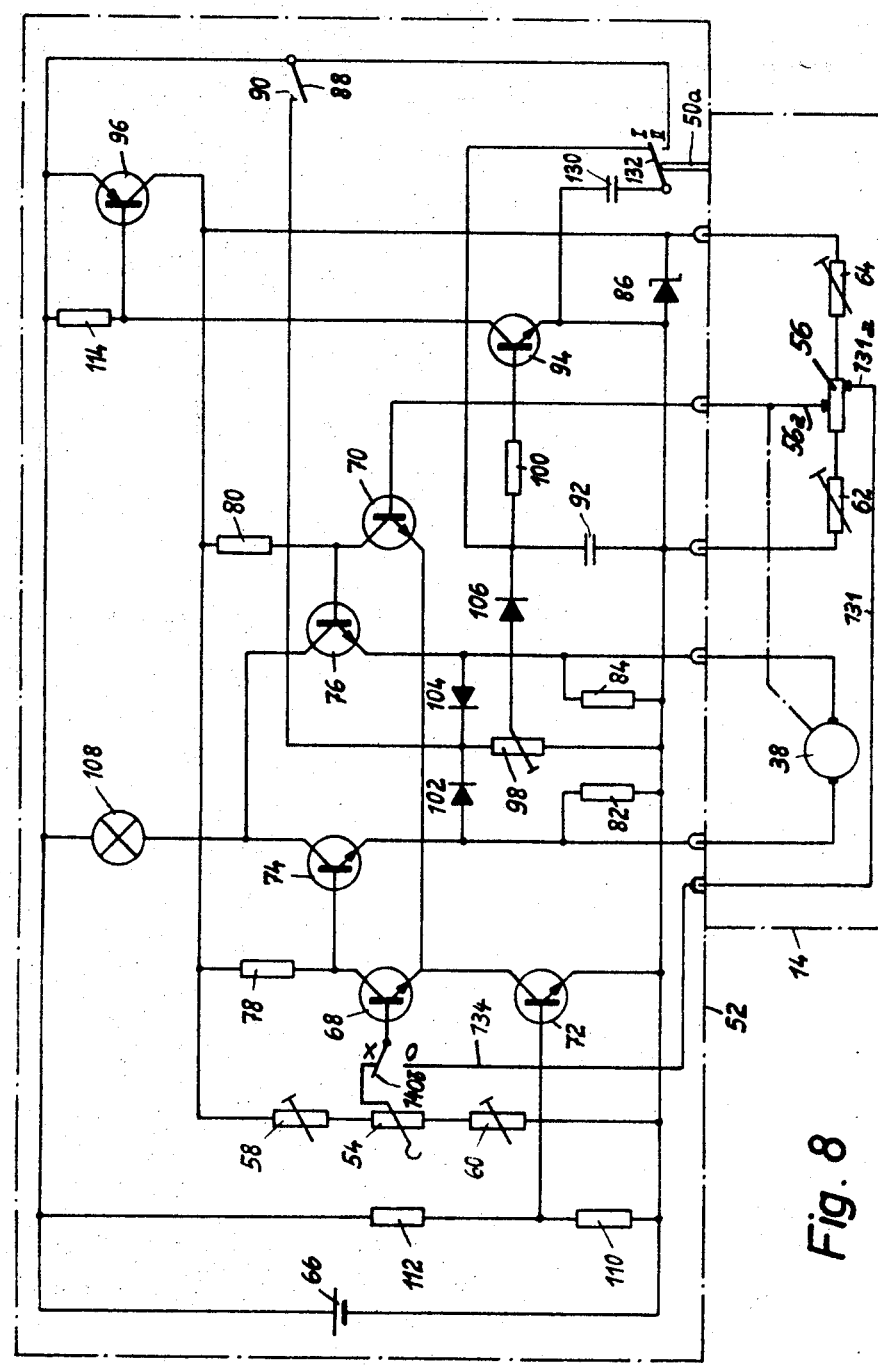
FIG. 8 is a schematic wiring diagram illustrating the electrical control parts of the invention.

To provide for remote setting of the diaphragm, the electrical conductors leading to the setting motor 38 pass out of the shutter housing 14 in a cable 48 of appropriate length, and are provided with a plug 50 which can be pushed into a socket 52a of a switch box 52 (FIGS. 5-7) and which contains the main elements of an electronically operated follow-up control arrangement, the wiring diagram of which can be seen in FIG. 8.

The control arrangement comprises primarily a resistance bridge including a manually adjustable resistance 54 and a balance resistance 56 in the form of a setting potentiometer. Associated with the potentiometer 54 are two trim potentiometers 58 and 60, and associated with the potentiometer 56 are two trim potentiometers 62 and 64. These trim potentiometers can be tuned to the voltage drop of the main potentiometers with which they are respectively associated, to provide a setting range suited to the prevailing operating conditions.

A suitable current source, such for example as the battery 66, is connected to one diagonal of the bridge connection, and the setting motor 38 is connected to the other diagonal of the bridge through a D.C. voltage amplifier. This amplifier includes two transistors 68 and 70, the emitters of which are connected to each other as shown in the wiring diagram and are applied in common to the collector of a further transistor 72. Associated with the two transistors 68 and 70 are the two transistors 74 and 76, respectively, which act as emitter follow-ups. In addition to the parts above mentioned, the amplifier includes resistances 78, 80, 82, and 84, located in the functional positions shown in the wiring diagram.

The bridge voltage and the operating voltage for the transistors 74 and 76 are stabilized by the Zener diode 86, and are thus independent of the battery voltage. Between the battery 66 and the resistance bridge, there is a mechanical switch 88 having a contact spring 88. As described in more detail later, in connection with FIGS. 5-7, the switch spring 88 is coupled with the setting means of the manually settable resistance 54 in such a way that the switch spring member 88 is momentarily closed against the contact member 90 each time that the value of the resistance 54 is adjusted from one predetermined value to another, and when the readjustment motion is completed, the switch 88 is again opened to disengage the battery 66 from the bridge connections. During the adjusting motion when adjusting the resistance 54 from one value to another, however, the switch spring 88 comes into temporary engagement with the contact member 90 connected to an electronic switching arrangement which is brought into operation by the current impulse when the switch 88, 90 is closed, to connect the battery 66 to the bridge arrangement and to maintain this connection until the end of the balancing of the bridge, and thus until the end of the follow-up procedure.

The electronic arrangement also includes a condenser 92, two transistors 94 and 96 coupled to the condenser, a potentiometer 98, a resistance 100, and three diodes 102, 104, and 106. These three diodes are so tuned, in conjunction with the potentiometer 98, that there is only a very small voltage at the condenser 92 when the bridge is balanced, and the transistor 94 cannot become operable.

In addition, there is a control lamp or signal lamp 108 connected at one side to the battery 66 and connected at the other side to the collector branches of both transistors 74 and 76, the connections being such that the lamp 108 is illuminated during the follow-up procedure. The circuitry also includes some further resistances indicated at 110, 112, and 114. The way in which all of the various elements are electrically connected to each other is plainly shown in the wiring diagram, FIG. 8, and so need not be further described.

The setting motor 38 and the setting potentiometer 56 with its trim potentiometers 62 and 64 are preferably installed in the shutter housing 14, while the other electrical elements are preferably installed in the separate control box 52 which may be remote from the shutter housing 14 and is electrically connected thereto through the various conductors in the cable 48. The sliding contact member or slider of the potentiometer 56 is shown at 56a (FIGS. 3 and 8) and is carried by an insulated arm 36c mounted on the diaphragm control ring 36. The potentiometer 56 and the associated contact strip 56b concentric with and spaced radially from the potentiometer, are both mounted on an insulating plate 116 which is adjustable in a direction circumferentially of the shutter housing 14 (concentrically around the optical axis) for calibrating purposes, by loosening the normally tight holding screws 118 which extend through arcuate slots 116a in the plate 116.

The insulating arm 36c cooperates, as further described below, with an adjustable abutment 120 which limits the movement of the arm 36c in a counterclockwise direction when viewed as in FIG. 3. This abutment 120 may be adjusted in a direction circumferentially of the shutter housing 14, upon loosening a normally tight screw 122 which extends through an arcuate slot 120a in the abutment piece 120. Fastened to the abutment piece 120 by means of an insulating layer 131b is a conductor 131 having a contact tongue 131a which bears on the potentiometer 56 in such a way as to make contact with the slider 56a shortly before the insulating arm 36c strikes against the abutment 120. The conductor 131 is connected, through the cable 48 and plug 50, to a conductor 134 in the control box or switch box 52.

Referring now to the elements in the control box 52 (FIGS. 5-7) the potentiometer or variable resistance 54 has a slider 54a, one arm of which slides longitudinally along the potentiometer while another arm of the slider slides along a contact strip parallel to the potentiometer. The slider is mounted on an insulating piece 124a which is coupled to the manually adjustable setter knob 124 which is displaceable along a slot in the top wall of the box 52, the slot being parallel to the potentiometer 54. Connected to the knob 124, within the box 52, is a ratchet piece or notched member 124b, preferably of insulating material, having a plurality of detents or notches 124c. A ball 126 is mounted beneath the notched member 124b in an opening in a fixed partition, and rests upon the previously mentioned contact spring 88, which constantly tends to raise the ball 126 to engage to ball in which ever one of hte notches 124c is opposite the ball at that time. When the knob or finger piece 124 is moved longitudinally along the slot, the ball 126 is forced out of the notch 124c in which it was seated, and the downward motion of the ball flexes the spring contact 88 downwardly so that the free end thereof makes momentary contact with the contact plate 90, until the next notch comes opposite the ball and the ball rises into the next notch, breaking the contact between the parts 88 and 90. Thus it is only during movement from one position of the setting knob 124 to the next position, that the switch 88, 90 is momentarily closed, the switch being open the rest of the time. The setter 124 is provided with an index mark 124d which cooperates with a diaphragm aperture scale 128 on the top wall of the box 52, this diaphragm aperture scale being graduated in the usual familiar f numbers, the spacing of successive numbers on the scale being the same as the spacing of the various notches 124c.

The electronic control arrangement for the timing and programming of the shutter is also supplied with current from the battery 66 located in the switch box or control box 52. A manually accessible setting member 136 is slidable along a slot in the top of the switch box 52, parallel to the slot along which the setting member 124 slides, the member 136 is provided with an index mark 136a cooperating with a shutter speed or exposure time scale 138 marked on the switch box. Movements of the setting member 136 along its slot serve in known manner, not here shown, to adjust the speed of the shutter. For example, the setting member 136 may be connected to a slider which slides along a potentiometer to vary the resistance thereof, the varying of such resistance serving to produce a corresponding adjustment of the electronic control of the duration of the exposure, in known manner. In addition, a program switch 140 is pivotally mounted on a pin 140a on the switch box 52. This switch serves to set the electronic arrangement of the shutter 14 for different programs, upon turning the switch member 140 so that the index 140c thereof is opposite one or other of the graduations X, T, or O.

When the program switch 140 is in the X position, the shutter is set for an automatically or internally timed exposure, with or without X-type flash. When the switch is in the T position, the shutter mechanism is set for a time exposure, and when the switch is in the O position, the shutter is set for interim inspection of the image on the focusing screen; that is, the shutter blades are open for focusing and composition of the picture. This part of the control arrangement of the shutter program may take the form disclosed in the above mentioned Patent 3,253,529, or any other convenient form known in the art.

According to one aspect of the present invention, this same program control switch 140 also forms a switch for the resistance of the follow-up control arrangement which determines the diaphragm aperture. For this purpose, the program switch 140 (FIG. 6) carries a switch member 140b (FIG. 8) which, when in the X position, connects the slider 54a of the manually adjustable resistance or potentiometer 54 to the base of the transistor 68 of the follow-up control arrangement, as clearly seen in FIG. 8. However, as also seen in FIG. 8, when the switch 140 is in the O position rather than the X position, the slider 54a of the potentiometer 54 is disconnected from the transistor 68 and, instead, the base of the transistor is connected to the conductor 134 which, as previously mentioned, leads to the conductor 131 in the shutter housing 14 and thus to the tongue 131a of the balancing resistance or potentiometer 56.

The control box 52 also has a trip button 142 (FIG. 6) which, when actuated, releases the shutter to make an exposure.

Figure 6:
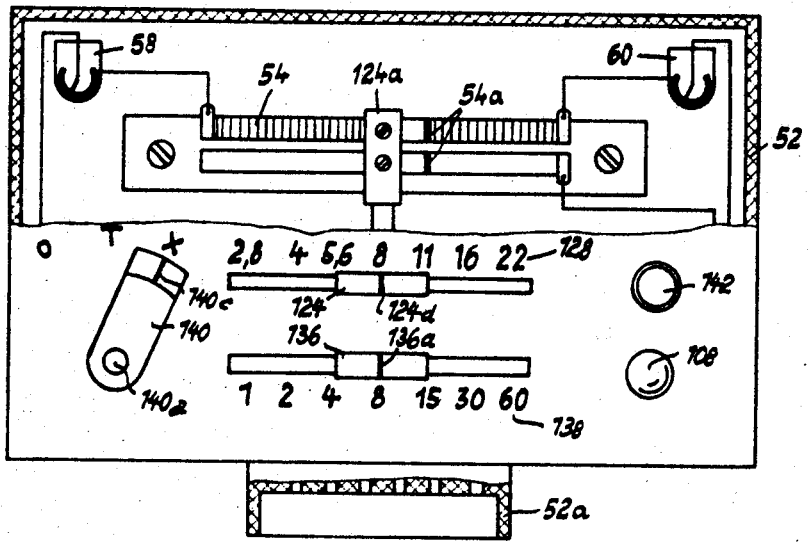
FIG. 6 is a plan of the switch box, with parts broken away and parts removed to show the construction beneath, and with parts in section.

The operation of the described arrangement is as follows: It will be assumed that the switch box 52 is connected by the plug 50 to the elements of the control arrangement in the shutter housing 14, and that the diaphragm aperture is adjusted to the value f/8, as indicated by the position of the adjusting member 124 as seen in FIG. 6. In the rest position, the battery 66 is disconnected, with the switch 88, 90 open, and the control lamp 108 is therefore not illuminated.

To prepare for a fresh photograph, the user sets the program switch 140 at the position T. As a result, the shutter blades 22 are opened, in a manner not illustrated but well understood in the art, upon first operation of the trip member 142. The user is then able to inspect the photographic image as produced on the focusing screen through the existing diaphragm aperture f/8, and if necessary can adjust the setting knob 124 on the switch box 52 to change the diaphragm aperture in one direction or the other. Assuming, for the moment, that the photographer wishes to set the diaphragm at f/5.6 instead of f/8, the setting member 124 is moved to the left when viewed as in FIG. 6, to bring the index mark 124d opposite the graduation 5.6 of the scale 128. As the setting member 124 is moved from one position to the other, the ball 126 is momentarily depressed and the switch 88, 90 is momentarily closed, and the switch opens again when the setting member reaches the 5.6 position. Upon the momentary closing of the switch 88, 90 a current impulse passes from the battery 66 to the potentiometer 98 of the switching arrangement, and this is sufficient to charge the condenser 92 to the critical voltage of transistor 94 and to open this transistor. This transistor then also opens the further transistor 96, whereby the voltage stabilized Zener diode 86 is applied to the battery 66 and the follow-up control arrangement is energized.

Displacement of the setting member 124 and its slider 124a, 54a not only causes a momentary closing of the switch 88, 90, but also brings about an imbalance in the bridge connections. The base of the transistor 68 becomes, for example, increasingly positive, and there is a voltage drop at the resistance 78 which reduces the base voltage of the transistor 74. This brings about a small drop in voltage at the resistance 82. A small drop in voltage occurs at the same moment at the resistance 80 in view of the emitter coupling of transistors 68 and 70, and thus a corresponding voltage increase occurs at the resistance 84, through the agency of the emitter follower 76. As a consequence of the resultant voltage difference between the resistances 82 and 84, the settting motor 38 will be set into motion in such direction as to move the slider 56a of the potentiometer 56 toward a balanced condition. In the specific construction here disclosed, this movement of the slider 56a takes place upon rotation of the diaphragm control ring 36 by motor 38. In the example given, the diaphragm control ring 36 will move in a counterclockwise direction, and will adjust the diaphragm aperture from the value 8 to the value 5.6. As soon as a balanced condition is achieved between the bridge resistances 54 and 56, the setting motor 38 will stop, terminating the follow-up procedure.

During the follow-up procedure, the signal lamp 108 is illuminated, and is extinguished only when the bridge is balanced. As soon as the balanced condition is reached, the voltage charge in the condenser 92 drops again until the transistors 94 and 96 are blocked, as a result of which the follow-up control arrangement is again disconnected from the battery 66.

The user maintains the follow-up control for the diaphragm in operation, by moving the setting member 124 from one value to another, until the photographic image observed on the focusing screen has the required depth of field which, as well known in the art, is dependent upon the diaphragm aperture. Then the user closes the shutter blades 22 by another operation of the trip 142. He then removes the focusing screen (ground glass or equivalent) and inserts the film cassette or film holder, and returns the program switch 140 from the T position to the X position. If he then operates the trip member 142 again, the parts will be operated to take a photograph at the diaphragm aperture already set by the follow-up mechanism in the manner above described, and at a shutter speed or exposure period determined by the relation of the shutter speed adjusting member 136 to the shutter speed scale 138.

The follow-up control arrangement also provides a second condenser 130 (FIG. 8) which can be connected by means of a switch 132 either in parallel to the condenser 92, when the switch 132 is in position I, or to the battery 66, when the switch 132 is in position II. This switch is spring biased toward position II, and is moved from position II to position I by a pin 50a (FIGS. 1 and 8) on the circuit connecting plug 50 when the plug is inserted in the socket 52a (FIG. 6) of the control box 52. Thus whenever the cable connection between the camera and the control box is effective, the switch 132 is in position I, and whenever the cable plug is disconnected, the switch is in position II.

To give the follow-up control arrangement greater utility, its effective range is made large enough to allow it to control all of the diaphragm values which are anticipated in various kinds of cameras with which the control arrangement is likely to be used. Thus the bridge potentiometer 54 and the diaphragm scale 128 of the control box 52 have a very large range, extending from the largest diaphragm aperture likely to be found on any camera with which this equipment is to be used, to the smallest diaphragm aperture likely to be found on any such camera. However, it may frequently happen that the diaphragm of a particular camera with which the equipment is to be used, has less range at one or both ends. For example, if the diaphragm range of the control box extends from $f/2.8$ to $f/22$, it is possible that the equipment may be used with a camera having a diaphragm range extending only from $f/4$ to $f/22$, or from $f/5.6$ to $f/22$. Thus it may be impossible, with a particular camera, to set as large a diaphragm aperture as is indicated on the control box 52.

In such a case, the range of movement of the slider 36c, 56a (FIG. 3) over the balancing resistance 56 in the shuter housing, is suitably restricted by proper setting of the adjustable limit stop 120 mentioned above. When it is attempted, by operation of the control knob 124 on the control box 52, to set the diaphragm for a larger aperture than is possible with this particular diaphragm, the slider 36c, 56a abuts against the limit stop 120 during the follow-up process, so the diaphragm control ring 36 can turn no further in a counterclockwise direction and remains stationary in this position, but the setting motor 38 continues to run because the bridge circuit is not yet balanced. The slip coupling between the gears 42 and 44 permits the motor to continue to run without damage to any parts. The control lamp or signal lamp 108 remains lit, because the follow-up procedure is not completed. The continuous illumination of the lamp 108 draws the attention of the photographer to the limit situation. He can then move the setting knob 124 back until there is a balance between the bridge resistance 56 in its limit position and the manually adjustable bridge resistance 54. The lamp will then go out. Thus it can happen that during the diaphragm setting procedure explained above, with the shutter program switch 140 set to the T position, the lamp 108 will remain illuminated for a relatively long time if it is attempted to set the diaphragm to a value exceeding the maximum diaphragm aperture of the camera, until this is noticed by the photographer and the adjusting knob 124 is moved in the reverse direction to balance the bridge. Sometimes such a lengthy illumination of the lamp 108 is disturbing, and this can be avoided if the program switch 140 is moved to the O-position for interim inspection, rather than being moved to the T position.

In the O-position of the program switch 140, the shutter blades of the shutter 14 are fully open (just as in the case of opening the blades while the switch is in the T position) but instead of the manually adjustable potentiometer 54 being in the bridge circuit, a predetermined constant branch is effective, through the conductors 134 and 131 leading to the contact tongue 131a engaged with the balancing resistance or potentiometer 56. Thus the diaphragm leaves 32 are set to maximum aperture irrespective of the position assumed by the manual setting member 124 relative to the scale 128. The position of the setting member 124 controls the effective resistance, so far as the balancing or follow-up action is concerned, of the potentiometer 54, and since the potentiometer 54 is now out of the circuit (when the program switch 140 is in the O-position rather than the T or X position) the position of the setting member 124 has no effect. The contact tongue 131a will be so disposed, relative to the potentiometer 56, when assembling any particular camera unit, as to determine the maximum diaphragm aperture required of the particular lens used with that unit.

When the program switch 140 is turned back from O-position to X position, at the conclusion of the desired inspection, the blades 22 of the shutter 14 are closed again, and the diaphragm leaves 32 are brought to the desired aperture preselected by the position of the manual adjusting member 124, through the action of the potentiometer 54 which is again effective.

This has the advantage that a single control appliance 52 can be used for cameras of different maximum sizes of diaphragm apertures, without causing continuous illumination of the signal lamp 108 during the interim inspection and distracting the photographer during long inspection or discharging the battery for an unnecessary length of time.

Figure 9:
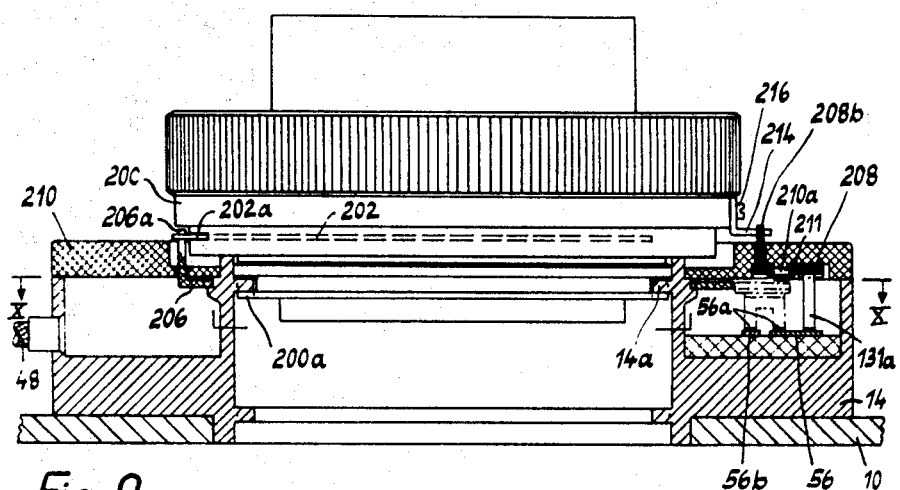
FIG. 9 is a schematic section taken axially through another embodiment of the invention.

In the above description of the first preferred embodiment of the invention, reference has been made to the fact that when the switch 140 is adjusted to the O-position, the diaphragm is brought to maximum aperture as determined by the position of the contact tongue 131a. This arrangement dealt with in the first embodiment of the invention, is only carried out for photographic apparatus with a specific objective lens and diaphragm, wherein the tongue 131a has been positioned in the proper position to cause maximum diaphragm aperture opening for that particular lens and diaphragm unit. But in a second preferred embodiment of the invention, which will now be described particularly with reference to FIGS. 9 and 10 of the drawings, the invention provides for carrying out this maximum opening of the diaphragm aperture without difficulty even in the case of interchangeable or replaceable lens and diaphragm units.

Figure 10:
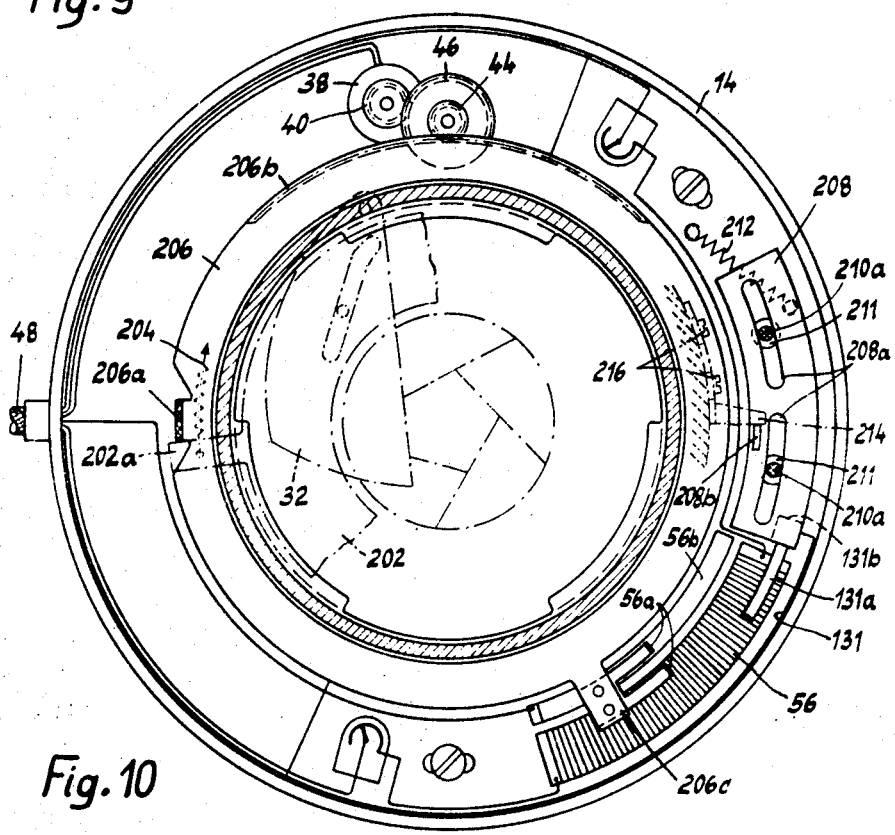
FIG. 10 is a cross section taken approximately on the line X—X of FIG. 9.

The camera 10 carries a shutter housing 14 in which are installed the shutter blades and the associated operating mechanism. However, in this second embodiment, the diaphragm leaves are not in the main shutter housing, but in a mount 200 of an interchangeable or replaceable lens and diaphragm unit. This mount 200 can be placed on the shutter housing 14 and engaged with conventional bayonet lugs 14a on the shutter housing, mating with conventional bayonet lugs of known type on the interchangeable mount 200. The diaphgram leaves 32, carried in the interchangeable mount 200, are shown in FIG. 10 by dot dash lines. They can be adjusted to the desired diaphragm aperture value, by means of a diaphragm control ring 202, also mounted in the interchangeable mount 200 and rotatable about the optical axis. A radial arm 202a on the ring 202 projects out through a slot in the circumference of the mount and is acted upon by a spring 204 tending to turn the ring 202 in a clockwise direction and thus to close the diaphragm leaves to minimum aperture.

A diaphragm transmission ring 206, preferably made of insulating material, is rotatably mounted within the shutter housing 14 and is provided with a lug 206a projecting forwardly parallel to the optical axis, into the plane of the diaphragm control ring 202. Gear teeth 206b on the ring 206 are in mesh with the last gear 44 of the gear train 40, 46, 44 which is driven by the motor 38, the arrangement being similar to the parts bearing the same reference numerals in the first embodiment of the invention. The balancing resistance or potentiometer 56 is mounted in the shutter housing 14, and the slider 56a cooperating therewith and with the contact strip 56b is mounted on the arm 206c of the diaphragm transmission ring 206, the arrangement being similar to that described in connection with the potentiometer 56 and slider 56a of the first embodiment, except that here the slider is carried by an arm on a diaphragm transmission ring, rather than by an arm directly on the diaphragm control ring as was the case in the first embodiment.

When using an interchangeable lens mount with a built-in diaphragm, it frequently happens that different lens mounts have diaphragms with different maximum apertures. Therefore, the angular disposition of the contact tongue 131a with relation to the potentiometer 56 will need to be different, when different interchangeable lens mounts are atached, in order to produce the required resistance value of the constant branch of the resistance bridge needed for achieving maximum diaphragm aperture with a particular interchangeable mount. To provide for automatic adaptation of the position of the contact tongue 131a relative to the potentiometer 56 for different interchangeable mounts, and thus to provide for simple operation in this respect without additional mechanism, the following arrangement is used: The holder 131b of the contact tongue 131a is molded or otherwise suitably secured in an arcuate slide 208 of insulating material, which slide is mounted for circumferential movement in the shutter housing 14. Preferably the slide 208 is mounted by means of two guide pins 210a provided on the cover plate 210 of the shutter housing 14 and projecting inwardly therefrom. These guide pins engage in arcuate slots 208a in the slide member 208, and a spring ring 211 on each guide pin 210a holds the slide 208 against displacement in the direction of the optical axis. A spring 212 is anchored at one end to the cover plate 210, and at the other end is attached to the slide 208, biasing the slide in a counterclockwise direction to a limit or end position.

For moving the slide 208 circumferentially to a position appropriate to the particular interchangeable lens mount which may happen to be attached to the shutter housing, the lens mount is provided with an operating member in the form of a radical arm 214 projecting radially outwardly from a circumferential plate secured to the interchangeable mount 200 by means of screws 216 which pass through circumferential slots in the plate, thus allowing the plate to be adjusted in a direction circumferentially of the mount 200, when the screws are loosened, the plate being held tightly when the screws are tightened. When the interchangeable objective unit is applied to the shutter housing and engaged by the usual twisting action familiar in bayonet connections, the operating member 214 turns with the mount 200 during the twisting motion of the mount, and engages a projection 208b on the slide 208, which projection 208b projects forwardly from the slide 208, parallel to the optical axis, and out through a circumferential slot in the front plate 210 of the housing 14. The engagement of the operating member 214 with the projection 208b entrains the slide 208 and carries the slide 208 around in a clockwise circumferential direction, concentric with the optical axis, to bring the contact tongue 131a to the required position on the potentiometer 56, corresponding to the required resistance value for opening the diaphragm to maximum aperture. The operating member 214 is, of course, calibrated to the proper position on the mount 200, depending upon the diaphragm characteristics of the diaphragm which is in this mount. The tongue 131a remains in proper position on the potentiometer 56, so long as this particular mount remains attached to the shutter housing 14.

The other parts of the construction according to this second embodiment of the invention are the same as those previously described in connection with the first embodiment. Thus when the program switch 140 is moved to the O-position for opening the shutter blades for interim inspection, the diaphragm is opened to maximum aperture of which this particular diaphragm is capable, regardless of the position which may be occupied by the finger piece or manual setting knob 124, this maximum opening being accomplished by the proper positioning of the tongue 131a with reference to the potentiometer 56, by the action of the operating member 214 on the interchangeable lens mount, as above described.

The construction disclosed in connection with this second embodiment has the advantage that a single balancing resistance or potentiometer in the photographic apparatus can be associated with various different replaceable or interchangeable objective mounts, and the act of attaching each replaceable mount and twisting it to its final or home position automatically sets the contact tongue 131a to proper position for producing maximum diaphragm opening for inspection purposes. Also, because of the adjustability of the operating member 214 in a circumferential direction (upon loosening the screws 216) it follows that if it is desired to remove the diaphragm assembly from a particular lens mount and replace it with a different diaphragm assembly, this can be done and the operating member 214 may be repositioned to whatever extent is necessary to calibrate it for the different characteristics of a different diaphragm assembly in the same lens mount. Any necessary adjustment of the operating member or positioning member 214 can be carried out by the manufacturer of the lens mount during initial assembly, or later during installation of the lens elements, in either case without difficulty. Thus this second embodiment of the invention offers an arrangement which is adaptable within wide limits and produced with a minimum of constructional parts, for limiting the follow-up movement of the diaphragm to take advantage of maximum diaphragm aperture of whatever replaceable objective lens is used on a particular occasion.

It has been mentioned above that the program switch 140 has three possible positions as indicated in FIG. 6, being the O-position, the T position, and the X position. In FIG. 8 the electrical connections for only two positions, the O-position and the X position, are shown. It is to be understood, however, that in the T position of the switch 140, the electrical connections are exactly the same as in the X position, so far as the circuits shown in FIG. 8 are concerned. The difference between the T position and the X position is not a difference with respect to the diaphragm control mechanism, but only a difference with respect to the operation of the shutter blades and their driving mechanism.

What is claimed is:

1. An electronically operated follow-up control device for a diaphragm of photographic apparatus, comprising electric circuit means including an electrical resistance bridge, a current source connected to one diagonal of said bridge, an electric motor effective to move said diaphragm to vary the aperture thereof, said motor being connected to another diagonal of said bridge, a manually adjustable first electric resistance settable to different values corresponding to different desired diaphragm apertures, and a balancing second resistance having a value varying in accordance with the aperture of said diaphragm, said circuit means being so connected that a change in said manually adjustable first resistance normally causes said motor to operate to change the aperture of said diaphragm until a change in said balancing second resistance causes said resistance bridge to be in balance, characterized by switch and circuit means for operatively disconnecting said manually adjustable first electrical resistance from said bridge and for operatively connecting, in place thereof, a resistance of constant value suited to the maximum diaphragm aperture of the particular diaphragm with which the follow-up control device is being used.

2. A device as claimed in claim 1, in combination with a photographic shutter electrically operable in accordance with various different programs and having a selector switch for selecting a desired program of operation, further characterized by the fact that said switch for operatively disconnecting said first electrical resistance is combined with said selector switch to form a single movable switch member which automatically disconnects said first resistance and connects said resistance of constant value whenever said selector switch is moved to a position selecting a predetermined shutter program.

3. A device as claimed in claim 2, wherein the diaphragm and the shutter are disposed in one housing, and the selector switch and said first resistance are in a control housing separate from the shutter housing.

4. A device as claimed in claim 1, further comprising a shutter housing, and a lens mount detachable from and replaceable on said shutter housing, said diaphragm being carried by said lens mount, characterized by the fact that said resistance of constant value is adjustable in accordance with differing requirements of different diaphragm in different detachable lens mounts, and that the act of placing the lens mount on the shutter housing adjusts the resistance to the required value.

5. A device as claimed in claim 4, wherein said resistance of constant value comprises a resistance member and a contact member movable to various positions of contact with said resistance member, both of said members being mounted in said shutter housing, spring means tending to move said contact member to a predetermined limit position with respect to said resistance member, and an operating member on said lens mount for engaging said contact member and moving said contact member against the force of said spring means, by the act of placing said lens mount on said shutter housing.

6. A device as claimed in claim 5, further characterized by the fact that said operating member is adjustable relative to said mount and may be clamped in any one of a plurality of positions thereon.

7. A device as claimed in claim 4, wherein said resistance of constant value comprises a resistance member and a contact member movable to various positions of contact with said resistance member, characterized by the fact that said contact member is attached to a slide made of insulating material, said slide being movable in a circumferential direction concentric with the optical axis of said shutter housing, and a projection on said slide, which may be engaged to move said slide in said circumferential irection.

References Cited

UNITED STATES PATENTS

| | | | |
|---|---|---|---|
| 3,120,161 | 2/1964 | Pickens et al. | 95—64 |
| 3,122,978 | 3/1964 | Blieske | 95—64 XR |
| 3,324,777 | 6/1967 | Kanner | 95—64 XR |
| 3,340,785 | 9/1967 | Adler et al. | 95—64 XR |

FOREIGN PATENTS 2,239 5/1962 Japan.

NORTON ANSHER, Primary Examiner

JOSEPH F. PETERS, Jr., Assistant Examiner

U.S. Cl. X.R.

95—53; 318—29